US007233831B2

(12) United States Patent
Blackwell

(10) Patent No.: US 7,233,831 B2
(45) Date of Patent: Jun. 19, 2007

(54) SYSTEMS AND METHODS FOR CONTROLLING PROGRAMMABLE LIGHTING SYSTEMS

(75) Inventor: Michael K. Blackwell, Milton, MA (US)

(73) Assignee: Color Kinetics Incorporated, Boston, MA (US)

( * ) Notice: Subject to any disclaimer, the term of this patent is extended or adjusted under 35 U.S.C. 154(b) by 716 days.

(21) Appl. No.: 10/163,085

(22) Filed: Jun. 5, 2002

(65) Prior Publication Data

US 2003/0028260 A1 Feb. 6, 2003

Related U.S. Application Data

(63) Continuation-in-part of application No. 09/870,418, filed on May 30, 2001, and a continuation-in-part of application No. 09/616,214, filed on Jul. 14, 2000.

(60) Provisional application No. 60/296,377, filed on Jun. 6, 2001, provisional application No. 60/143,790, filed on Jul. 14, 1999.

(51) Int. Cl.

| | |
|---|---|
| ***G05B 11/01*** | (2006.01) |
| ***G05B 19/42*** | (2006.01) |
| ***G06F 17/00*** | (2006.01) |
| ***G06F 15/16*** | (2006.01) |
| ***F21V 33/00*** | (2006.01) |

(52) U.S. Cl. .............................. 700/17; 700/7; 700/19; 700/23; 700/87; 700/89; 700/90; 709/200; 715/731; 715/734; 715/961; 362/85

(58) Field of Classification Search .................... 703/1; 700/1-5, 7-9, 11-17, 19, 23, 24, 27, 83, 86-89, 700/90; 345/207, 426; 709/200; 715/700, 715/731, 734-736, 773, 961, 965; 362/85; 718/1, 102

See application file for complete search history.

(56) References Cited

U.S. PATENT DOCUMENTS 3,898,643 A 8/1975 Ettlinger (Continued)

FOREIGN PATENT DOCUMENTS

EP 0495305 A2 7/1992

(Continued)

OTHER PUBLICATIONS http:www.strandlight.com/us/architectural.html, "Architectural Control Systems".
http://www.strandlight.com/Architectural%20Specifications/Premiere.doc, "Strand Lighting Specification".

*Primary Examiner*—Leo Picard
*Assistant Examiner*—Sean Shechtman
(74) *Attorney, Agent, or Firm*—Wolf, Greenfield & Sacks, P.C.

(57) ABSTRACT

One embodiment of the present invention is directed to a control system. The control system may be adapted to control one or more lighting systems (e.g. stand-alone or networked lighting systems). The control system may also have a user interface (e.g. dial or button) such that a user can make a program selection and/or alter a lighting control feature. The control system may also include an enablement system. In an embodiment, the enablement system may be arranged to provide a user and/or installer with the ability to enable a program, program setting or the like. For example, the control system may be programmed with three lighting control programs and the user may only want to select from two of the three programs once the control system is installed. The user may make a selection on the enablement system such that only the two desired programs are available from through the user interface.

57 Claims, 5 Drawing Sheets

U.S. PATENT DOCUMENTS 4,570,216 A * 2/1986 Chan .......................... 700/14
4,622,881 A * 11/1986 Rand ........................ 84/464 R
4,962,687 A 10/1990 Belliveau et al.
5,307,295 A * 4/1994 Taylor et al. .................. 703/1
5,329,431 A * 7/1994 Taylor et al. ................. 362/85
5,406,176 A * 4/1995 Sugden ....................... 315/292
5,502,627 A * 3/1996 Hunt et al. ................. 362/286
5,621,282 A * 4/1997 Haskell ...................... 315/324
5,629,587 A * 5/1997 Gray et al. ................. 315/292
5,699,243 A * 12/1997 Eckel et al. .................. 700/17
5,769,527 A 6/1998 Taylor et al.
5,838,226 A * 11/1998 Houggy et al. ........ 340/310.11
5,905,442 A * 5/1999 Mosebrook et al. ......... 340/3.7
5,945,993 A * 8/1999 Fleischmann ............... 715/771
5,986,414 A * 11/1999 Bocchicchio et al. ....... 315/312
6,016,038 A 1/2000 Mueller et al.
6,145,999 A * 11/2000 Van Derlande ............. 362/252
6,150,774 A 11/2000 Mueller et al.
6,166,496 A 12/2000 Lys et al.
6,211,626 B1 4/2001 Lys et al.
6,292,901 B1 * 9/2001 Lys et al. ................... 713/300
6,340,868 B1 1/2002 Lys et al.
6,361,198 B1 * 3/2002 Reed .......................... 362/554
6,459,919 B1 * 10/2002 Lys et al. ................... 600/407
6,466,234 B1 * 10/2002 Pyle et al. .................. 715/771
6,528,954 B1 3/2003 Lys et al.
6,548,967 B1 4/2003 Dowling et al.
6,577,080 B2 6/2003 Lys et al.
6,608,453 B2 8/2003 Morgan et al.
6,624,597 B2 9/2003 Dowling et al.
6,687,487 B1 * 2/2004 Mosebrook et al. ....... 455/11.1
6,717,376 B2 4/2004 Lys et al.
6,720,745 B2 * 4/2004 Lys et al. ................... 315/312
6,774,584 B2 8/2004 Lys et al.
6,777,891 B2 8/2004 Lys et al.
6,781,329 B2 8/2004 Morgan et al.
6,788,011 B2 9/2004 Mueller et al.
6,801,003 B2 10/2004 Schanberger et al.
6,806,659 B1 10/2004 Mueller et al.
6,869,204 B2 3/2005 Piepgras et al.
6,883,929 B2 4/2005 Dowling
6,888,322 B2 5/2005 Dowling et al.
6,897,624 B2 5/2005 Ducharme et al.
6,936,978 B2 8/2005 Morgan et al.
6,965,205 B2 11/2005 Piepgras et al.
6,967,448 B2 11/2005 Morgan et al.
6,969,954 B2 11/2005 Lys
6,975,079 B2 12/2005 Lys et al.
7,031,920 B2 4/2006 Dowling et al.
7,038,398 B1 5/2006 Lys et al.
7,038,399 B2 5/2006 Lys et al.
7,042,172 B2 5/2006 Dowling et al.
2002/0038157 A1 3/2002 Dowling et al.
2002/0047646 A1 * 4/2002 Lys et al. ................... 315/312
2002/0048169 A1 4/2002 Dowling et al.
2002/0070688 A1 6/2002 Dowling et al.
2002/0074559 A1 6/2002 Dowling et al.
2002/0078221 A1 6/2002 Blackwell et al.
2002/0130627 A1 9/2002 Dowling et al.
2002/0145394 A1 10/2002 Morgan et al.
2002/0145869 A1 10/2002 Dowling
2002/0152045 A1 10/2002 Dowling et al.
2002/0158583 A1 10/2002 Lys et al.
2002/0176259 A1 11/2002 Ducharme
2003/0011538 A1 1/2003 Lys et al.
2003/0028260 A1 2/2003 Blackwell
2003/0057884 A1 3/2003 Dowling et al.
2003/0057887 A1 3/2003 Dowling et al.
2003/0076281 A1 * 4/2003 Morgan et al. ............... 345/44
2003/0100837 A1 5/2003 Lys et al.
2003/0133292 A1 7/2003 Mueller et al.
2003/0222587 A1 12/2003 Dowling et al.
2004/0036006 A1 2/2004 Dowling
2004/0052076 A1 3/2004 Mueller et al.
2004/0090191 A1 5/2004 Mueller et al.
2004/0090787 A1 5/2004 Dowling et al.
2004/0105261 A1 6/2004 Ducharme et al.
2004/0116039 A1 6/2004 Mueller et al.
2004/0130909 A1 7/2004 Mueller et al.
2004/0178751 A1 9/2004 Mueller et al.
2004/0212320 A1 10/2004 Dowling et al.
2004/0212993 A1 10/2004 Morgan et al.
2005/0043907 A1 * 2/2005 Eckel et al. .................. 702/62
2005/0099824 A1 5/2005 Dowling et al.
2005/0116667 A1 6/2005 Mueller et al.
2005/0151489 A1 7/2005 Lys et al.
2005/0213352 A1 9/2005 Lys et al.
2005/0213353 A1 9/2005 Lys
2005/0218838 A1 10/2005 Lys
2005/0218870 A1 10/2005 Lys
2005/0219872 A1 10/2005 Lys
2005/0231133 A1 10/2005 Lys
2005/0236029 A1 10/2005 Dowling
2005/0236998 A1 10/2005 Mueller
2005/0253533 A1 11/2005 Lys et al.
2005/0275626 A1 12/2005 Mueller
2005/0276053 A1 12/2005 Nortrup
2006/0002110 A1 1/2006 Dowling
2006/0012987 A9 1/2006 Ducharme
2006/0016960 A1 1/2006 Morgan
2006/0022214 A1 2/2006 Morgan
2006/0050509 A9 3/2006 Dowling
2006/0076908 A1 4/2006 Morgan
2006/0098077 A1 5/2006 Dowling
2006/0104058 A1 5/2006 Chemel et al.
2006/0109649 A1 5/2006 Ducharme et al.
2006/0132061 A1 6/2006 McCormick et al.
2006/0152172 A9 7/2006 Mueller
2006/0158881 A1 7/2006 Dowling

FOREIGN PATENT DOCUMENTS

EP 0752632 A2 1/1997
FR 2 628 335 9/1989
JP 10208886 8/1998
WO WO 99/31560 6/1999

* cited by examiner

SYSTEMS AND METHODS FOR CONTROLLING PROGRAMMABLE LIGHTING SYSTEMS

CROSS-REFERENCES TO RELATED APPLICATIONS

This Patent Application claims the benefit under 35 U.S.C. §119(e) of the following U.S. Provisional Application:

Ser. No. 60/296,377, filed Jun. 6, 2001, entitled "SYSTEMS AND METHODS FOR CONTROLLING LIGHTING SYSTEMS".

This application also claims the benefit under 35 U.S.C. §120 as a continuation-in-part (CIP) of the following U.S. Non-provisional Applications:

Ser. No. 09/616,214, filed Jul. 14, 2000, entitled "SYSTEMS AND METHODS FOR AUTHORING LIGHTING SEQUENCES", which claims the benefit of U.S. Provisional Application Ser. No. 60/143,790, filed Jul. 14, 1999, entitled "CKI CONTROLLER"; and Ser. No. 09/870,418, filed May 30, 2001, entitled "A METHOD AND APPARATUS FOR AUTHORING AND PLAYING BACK LIGHTING SEQUENCES."

Each of the foregoing applications is hereby incorporated herein by reference.

FIELD OF THE INVENTION

The present invention relates to lighting systems, and more particularly, embodiments of the present invention relate to methods and apparatus for controlling various light sources.

BACKGROUND

Programmable Light Emitting Diode (LED) illumination systems are becoming increasingly popular due to the system's efficiencies, long life and dynamic controllability. Control systems for programmable lighting systems, such as LED illumination systems and the like, are available and can be used to generate complicated lighting effects. Many such control systems are adapted to control networked lighting devices. These systems tend to be complex and require significant expertise to set up and operate.

SUMMARY

An embodiment of the present invention is a lighting control system. The lighting control system may comprise a processor; wherein the processor is associated with memory; at least one lighting program stored in the memory; and a selection interface adapted to enable and disable a user interface's ability to select the at least one lighting program.

An embodiment of the present invention is a lighting control system. The lighting control system may comprise a processor; wherein the processor is associated with memory; at least one lighting program stored in the memory; a user interface adapted to at least one of select the at least one lighting program based on a user's input and adjust a parameter of the at least one lighting program based on a user's input; and a housing wherein the processor and the memory are housed; wherein the housing is adapted to mount into a standard wall mounted junction box.

An embodiment of the present invention may be a method of controlling a lighting system. The method may comprise the steps of providing a lighting control system wherein the lighting control system comprises a processor; wherein the processor is associated with memory; storing at least one lighting program in the memory; providing a selection interface adapted to enable and disable a user interface's ability to select the at least one lighting program; and making a selection on the selection interface to enable the user interface's ability to select the at least one lighting program.

An embodiment of the present invention may be a method of controlling a lighting system. The method may comprise the steps of providing a lighting control system wherein the lighting control system comprises a processor; wherein the processor is associated with memory; storing at least one lighting program in the memory; providing a user interface adapted to at least one of select the at least one lighting program based on a user's input and adjust a parameter of the at least one lighting program based on a user's input; and providing a housing wherein the processor and the memory are housed; wherein the housing is adapted to mount into a standard junction box.

DETAILED DESCRIPTION

Figure 1:
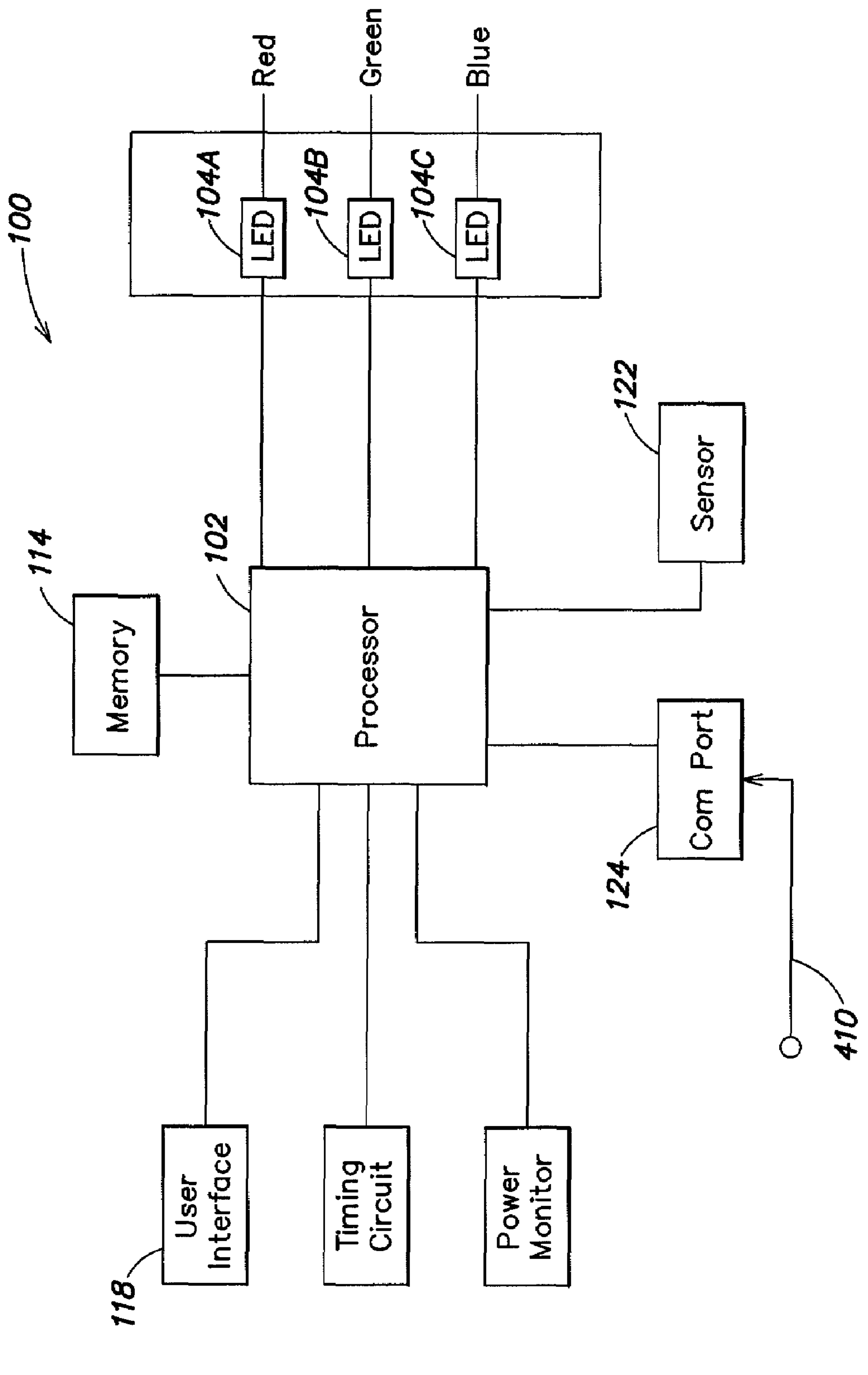
FIG. 1 illustrates a lighting system according to the principles of the present invention.

The applicant's have appreciated that the control of lighting systems (e.g. programmable lighting systems) tends to be complicated and non-intuitive. As a result, the use of such lighting systems has been limited to places where the users are more technically sophisticated or have the time to learn how such controllers are used. The applicant's have also appreciated that it would be useful to produce a more intuitive control system while maintaining flexibility in the control system.

Accordingly, one embodiment of the present invention is directed to a control system. The control system may be adapted to control one or more lighting systems (e.g. standalone or networked lighting systems). The control system may also have a user interface (e.g. dial or button) such that a user can make a program selection and/or alter a lighting control feature. The control system may also include an enablement system. In an embodiment, the enablement system may be arranged to provide a user and/or installer with the ability to enable a program, program setting or the like. For example, the control system may be programmed with three lighting control programs and the user may only want to select from two of the three programs once the control system is installed. The user may make a selection on the enablement system such that only the two desired programs are available through the user interface.

An embodiment of the present invention is a control system adapted for the control of lighting system(s). The control system may be arranged to fit into a conventional electrical junction box or similar configuration to provide a lighting control system that appears familiar to a user. For example, the control system may be programmed with a lighting program designed to control one or more lighting systems (e.g. programmable lighting systems) and the control system may include a user interface to select the program and/or alter the program before or during communication with the lighting system. The control system may be arranged to fit into a single or multi-position gang box (e.g. where a standard light switch would be mounted and electrically connected). The user interface may be arranged to provide the user control over the lighting effects produced by the lighting system. For example, the user interface may be arranged as a single point or multi-point contact for the user. For example, as a single point, the user interface may be a dial or button used to make a program selection of program modification, while a multi-point of contact may be used to provide the user with one point to select a program and another point to make a program modification. In an embodiment, a single point of contact may be used to provide multiple functions. For example, a combination switch and dial may be used. The switch may be used to select the program and the dial may be used to adjust a parameter of a lighting effect or program parameter, for example.

There are many programmable lighting systems that can benefit from a controller according to the present invention. In some instances a controller according to the present invention may be incorporated into such lighting systems and in other instances, the controller may reside remotely from the lighting system. Programmable lighting systems may be arranged as standalone lighting systems or they may be arranged as networked lighting systems. In a networked arrangement, they may be adapted to read control data from a data stream. In an embodiment, the lighting systems may be addressable lighting systems where they listen to a data stream and select the data that pertains to it. Programmable lighting systems may be adapted to generate lighting effects, vary in intensity, vary in color generated, generate temporal lighting effects, or generate and or control other lighting effects. In an embodiment, the programmable lighting system is an LED lighting system. In an embodiment the programmable lighting system is a color changing lighting system. In an embodiment, the programmable lighting system may be adapted to control the light output from an illumination source other than an LED illumination source. The lighting system may also control other parameters besides the illumination source. For example, the position of the lighting system, filters, or other functions may be controllable.

FIG. 1 illustrates a lighting system according to the principles of the present invention. Lighting system 100 may include one or more illumination sources, for example, LEDs 104A, 104B, and 104C. In an embodiment, the LEDs 104A, 104B, and 104C may produce different colors (e.g. 104A red, 104B green, and 104C blue). The lighting system 100 may also include a processor 102 wherein the processor 102 may independently control the output of the LEDs 104A, 104B, and 104C. The processor may generate control signals to run the LEDs such as pulse modulated signals, pulse width modulated signals (PWM), pulse amplitude modulated signals, analog control signals, current control signals, voltage control signals, or other control signals to vary the output of the LEDs. In an embodiment, the processor may control other circuitry to control the output of the LEDs. The LEDs may be provided in strings of more than one LED that are controlled as a group and the processor 102 may control more than one string of LEDs. A person with ordinary skill in the art would appreciate that there are many systems and methods that could be used to operate the LED(s) and or LED string(s) and the present invention encompasses such systems and methods.

A lighting system 100 according to the principles of the present invention may generate a range of colors within a color spectrum. For example, the lighting system 100 may be provided with a plurality of LEDs (e.g. 104A-C) and the processor 102 may control the output of the LEDs such that the light from two or more of the LEDs combine to produce a mixed colored light. Such a lighting system may be used in a variety of applications including displays, room illumination, decorative illumination, special effects illumination, direct illumination, indirect illumination or any other application where it would be desirable. Many such lighting systems may be networked together to form large networked lighting applications.

In an embodiment the LEDs 104 and or other components comprising a lighting system 100 may be arranged in a housing. The housing may be adapted to provide illumination to an area and may be arranged to provide linear lighting patterns, circular lighting patterns, rectangular, square or other lighting patterns within a space or environment. For example, a linear arrangement may be provided at the upper edge of a wall along the wall-ceiling interface and the light may be projected down the wall or along the ceiling to generate certain lighting effects. In an embodiment, the intensity of the generated light may be sufficient to provide a surface (e.g. a wall) with enough light that the lighting effects can be seen in general ambient lighting conditions. In an embodiment, such a housed lighting system may be used as a direct view lighting system. For example, such a housed lighting system may be mounted on the exterior of a building where an observer may view the lighted section of the lighting system directly. The housing may include diffusing, or other, optics such that the light from the LED(s) 104 is projected through the optics. This may aid in the mixing, redirecting or otherwise changing the light patters generated by the LEDs. The LED(s) 104 may be arranged within the housing, on the housing or otherwise mounted as desired in the particular application.

The lighting system 100 may also include memory 114 wherein one or more lighting programs and or data may be stored. The lighting system 100 may also include a user interface 118 used to change and or select the lighting effects displayed by the lighting system 100. The communication between the user interface and the processor may be accomplished though wired or wireless transmission. The lighting system 100 may also be associated with a communication port (COM PORT) 124 coupled to a network such that the lighting system 100 responds to network data 410. For example, the processor 102 may be an addressable processor that is associated with a network. Network data 410 may be communicated between the communication port 124 and a wired or wireless network and the addressable processor may be 'listening' to the data stream for commands that pertain to it. Once the processor 'hears' data addressed to it, it may read the data and change the lighting conditions according to the received data. For example, the memory 114 in the lighting system 100 may be loaded with a table of lighting control signals that correspond with data 410 the processor 102 receives. Once the processor 102 receives data from a network, user interface, or other source, the processor may select the control signals that correspond to the data 410 and control the LED(s) accordingly. The received data may also initiate a lighting program to be executed by the processor 102 or modify a lighting program or control data or otherwise control the light output of the lighting system 100. In another embodiment, the processor 102 may be a non-networked processor. The microprocessor may be associated with memory 114 for example such that the processor executes a lighting program that was stored in memory.

The lighting system 100 may also include sensors and or transducers and or other signal generators (collectively referred to hereinafter as sensors). The sensors may be associated with the processor 102 through wired or wireless transmission systems. Much like the user interface and network control systems, the sensor(s) may provide signals to the processor and the processor may respond by selecting new LED control signals from memory 114, modifying LED control signals, generating control signals, or otherwise change the output of the LED(s). In an embodiment, the lighting system may include a transmitter wherein the transmitter is associated with the processor 102. The transmitter may be used to communicate signals from one lighting system to another or to a device other than another lighting system.

While the LEDs 104A, 104B, and 104C in FIG. 1 are indicated as red, green and blue, it should be understood that the LED(s) in a system according to the present invention might be any color including white, ultraviolet, infrared or other colors within the electromagnetic spectrum.

Figure 2:
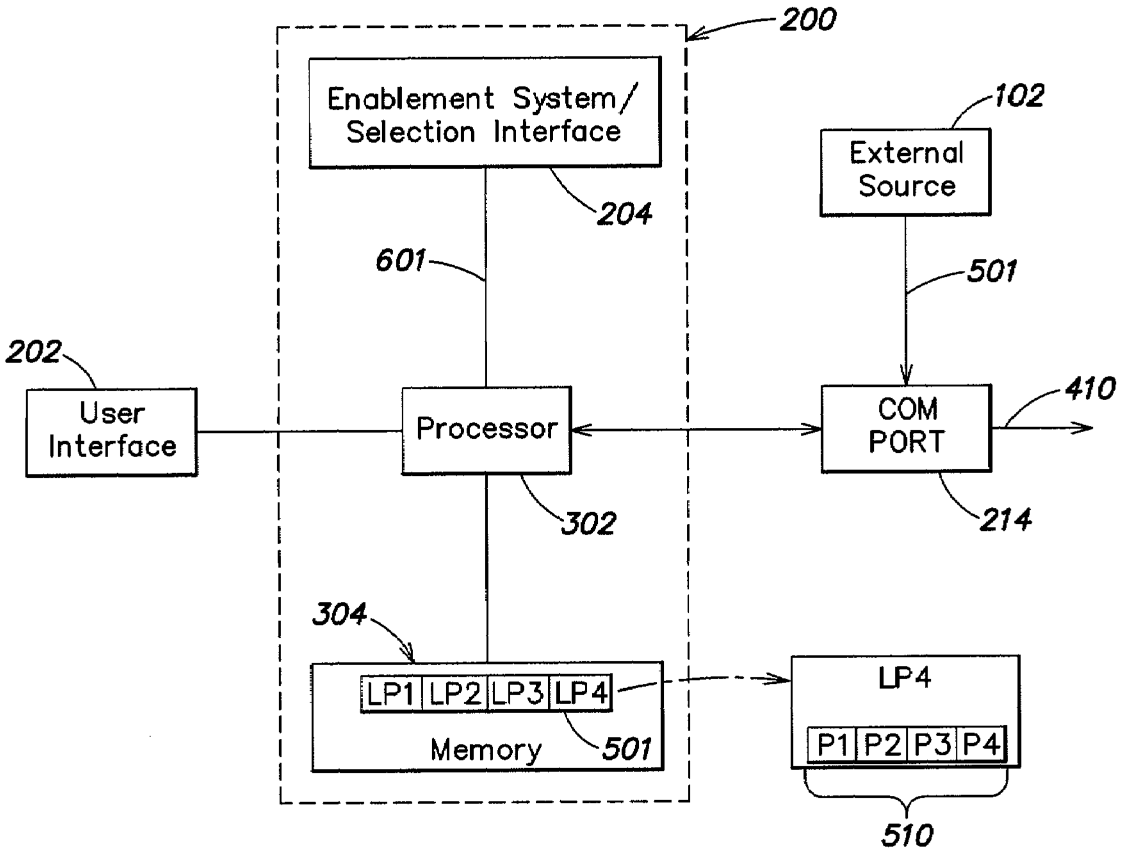
FIG. 2 illustrates a lighting control system according to the principles of the present invention.

FIG. 2 illustrates a lighting control system 200 according to the principles of the present invention that may be used to control one or more lighting systems 100 as shown in FIG. 1. The lighting control system 200 may itself include a processor 302, memory 304, communication port 214 (via which data 410 is provided to one or more lighting systems 100), and one or more user interfaces 202. The memory 304 may be loaded with one or more lighting programs 501 (e.g., lighting programs LP1 though LP4) and the system 200 may be arranged such that a user interface 202 can be used to select a program from the memory 304. The user interface 202 may be a button, switch, selector, dial, rotary switch, variable switch, variable linear switch, slider or other selector. In an embodiment, the user interface may be a single device providing single functionality (e.g. selector switch), a single device providing multiple functionality (e.g. monitored selector switch wherein the processor 302 monitors the selector for interpretation), multiple devices for multiple functions (e.g. two selectors) or it may be a combination device for multiple functions (e.g. combination dial/selector switch) or other desirable arrangement. The system 200 may be arranged, for example, such that every time the user interface 202 is activated, the processor 302 selects a new lighting program 501 from memory 304. In an embodiment, the memory 304 may only include one program (e.g., any one of lighting programs LP1-LP4) and the user interface 202 may be used to select the program upon first activation and select no program, or an off cycle, upon second activation of the user interface 202. In another embodiment, more than one lighting program 501 may be loaded into the memory 304. While a user interface 202 may be adapted to select a program from memory 304, the user interface may also, or instead, be adapted to modify a program or program parameter 510 in memory or as the program is being executed. FIG. 2 also shows an exploded view of an exemplary lighting program LP4, including four parameters 510 (e.g., parameters P1 through P4. For example, a lighting control system 200 may be adapted to generate data 410 to a lighting system 100 such that the lighting system in turn generates lighting control signals designed to gradually change the color of light generated by the lighting system 100. The user interface 202 of the lighting control system 200 in this example may be used to adjust the rate of the color change. Examples of other useful lighting programs include changing a lighting system to a particular color wherein the program may communicate lighting control signals via the data 410 to set the color of light generated by the lighting system 100 and the user interface 202 of the lighting control system 200 may be used to adjust the color. Other examples include coordinated effects such as chasing a rainbow of colors down a corridor though several different lighting systems where the user interface may be used to change the speed, direction, intensity, colors or other parameter of the chasing rainbow. There are many lighting effects that may be changed in response to a change in the user interface 202, such as the generated color, intensity, rate of change, direction of apparent propagation or any other alterable parameter.

In an embodiment, the duration the user interface 202 is activated may be monitored by the processor 302 in order to determine the appropriate action. For example, the processor 302 may monitor the state and or the duration of such state and adjust a parameter 510 of a program 501 in response to the state or duration of such state. In this example the user interface 202 may be a button that supplies a high or a low signal. The processor may monitor the duration of an activated state and modify a parameter 510 in a program 501 according to the duration. For example, the lighting controller 200 may be communicating a lighting show via the data 410 that is causing a lighting system 100 to emit saturated blue light. The program 501 generating the lighting show data 410 may include an adjustable parameter 510 for changing the color of the light. A user may activate (e.g. hold down a button) the user interface 202 and the processor may monitor the duration of the activation signal and adjust the parameter 510. As the user holds down the button, the data 410, and in turn the lighting control signals generated by the lighting system 100, begin to continually change and result in the lighting system continually changing color. When the lighting system is emitting the desired color, the user can deactivate the button causing the processor to stop changing the parameter. While this example provides for a continually changing parameter 510, it will be understood by one skilled in the art that the processor may monitor the user interface and adjust the lighting control parameters in a wide variety of ways such as measuring the time and making stepped adjustments. The processor may monitor the time and change to another lighting program if the period is less then or longer then a predetermined period, for example.

In an embodiment, the lighting control system 200 may include an enablement system or selection interface 204 as illustrated in FIG. 2. The enablement system 204 may be associated with the processor 302 and the processor 302 may monitor the enablement system 204 and allow the user interface selection or modification of only those lighting programs 501 that the enablement system 204 enables. For example, the enablement system 204 may be a set of switches wherein each of the switches in the set corresponds with a lighting program in memory 304. In an embodiment, the enablement system 204 may have a plurality of switches and the memory may be programmed with a plurality of programs 501. Each of the switches in the plurality of switches may be associated with one of the programs such that when the switch is activated the program is enabled to be selected by the user interface. For example, the enablement system 204 may have eight switches that may be placed in the on or off position and the memory may be programmed with eight programs. Each of the eight programs may be numbered one though eight and each of the switches may be numbered one though eight. When switch number one is put in the "on" position, program number one may be selectable though the user interface. Another example is where switches one, two and thee are "on" and four though eight are "off." The user may then use the user interface 202 to select program number one, two and thee while the remaining programs are not accessible from the user interface.

Figure 3A:
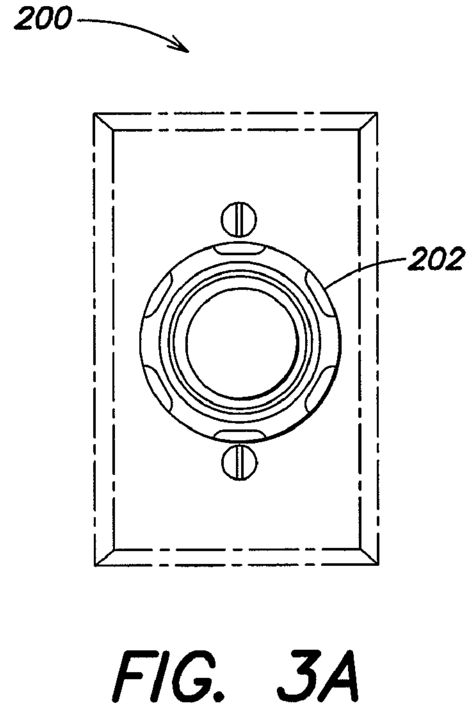
FIGS. 3A-3D illustrate respective front, side, top and rear views of a lighting control system according to one embodiment of the present invention.
Figure 3B:
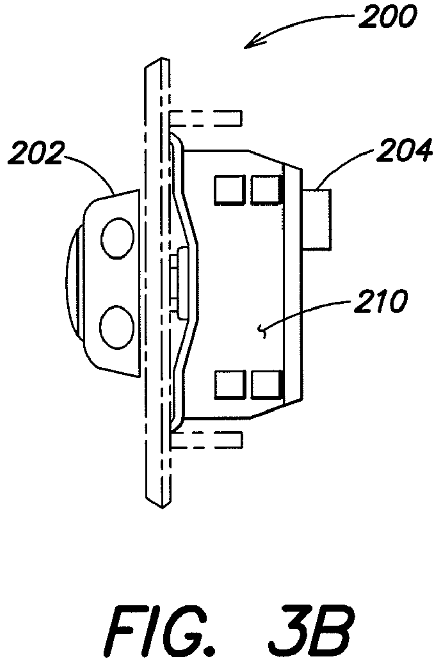
Figure 3C:
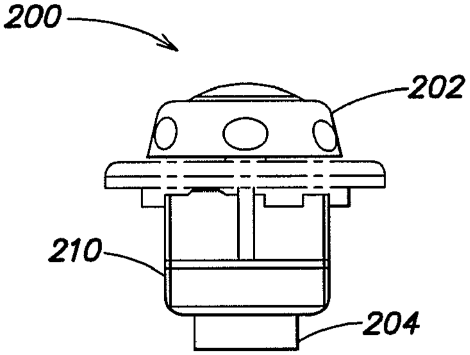
Figure 3D:
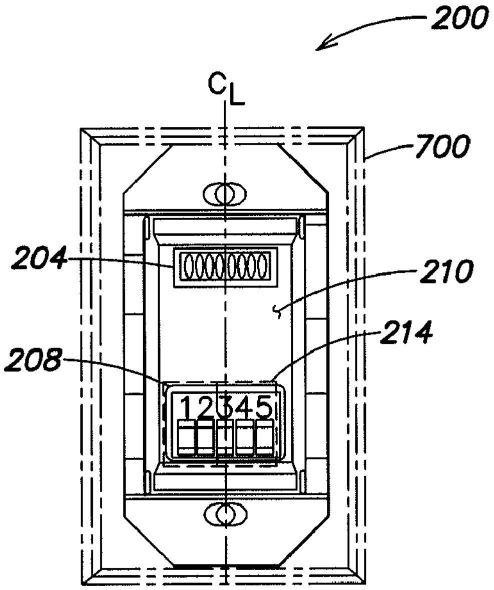
Figure 3E:
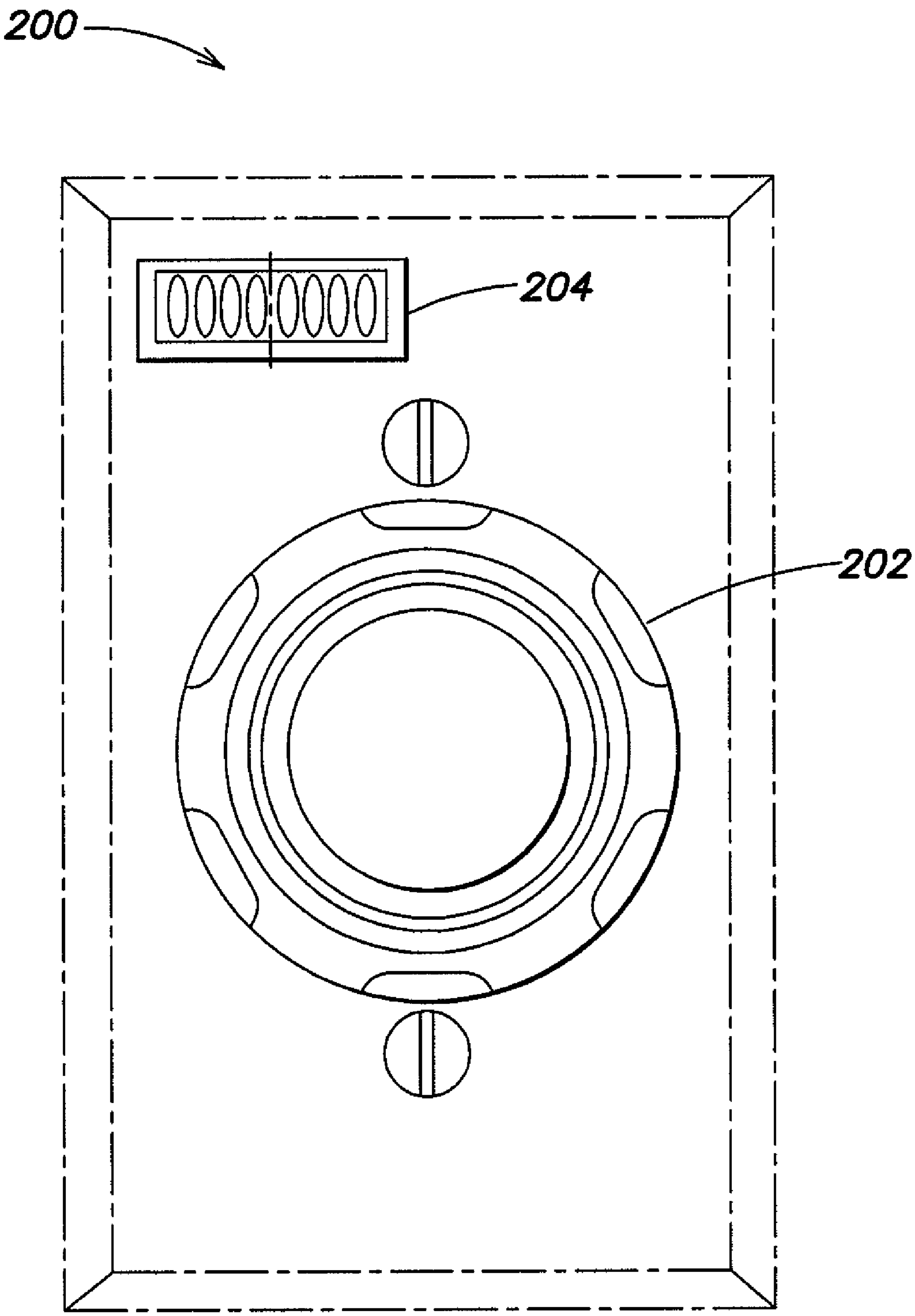
FIG. 3E illustrates a front view of a lighting control system according to another embodiment of the present invention.

In an embodiment, the enablement system 204 is located remotely from the user interface 202 to provide a master selection of the available shows. In another embodiment, the enablement system 204 is located near, or in the same housing, as the user interface 202. FIGS. 3A, 3B, 3C and 3D illustrate respective front, side, top and rear views of a lighting control system according to one embodiment of the present invention. In the embodiment of FIGS. 3A, 3B, 3C and 3D, the enablement selection system 204 is arranged so that it is not accessible to a common user. For example, the enablement selection system may reside on the back of a housing 210, as shown in FIGS. 3B, 3C, and 3D, wherein the back of the housing is designed to fit into a mounting box 700 (e.g. a junction box on a wall), where the user interface 202 would be mounted on the front, or exposed, face of the housing. This would provide user selection of lighting effects and shows that an installer deemed appropriate. This may be the case where a store owner wants to provide an area with controllable lighting effects but does not want shows numbered two and four to be used. These examples are intended to be illustrative and as a result should not be viewed as limiting in anyway. One skilled in the art will understand that the enablement system 204 does not need to be a switch or series of switches, it may incorporate any other selection system such as dial(s), button(s), interface port (e.g. wired or wireless) for communication with another device or the like. FIG. 3E illustrates a front view of another embodiment, in which the enablement system 204 is accessible to a user.

In an embodiment, the lighting programs may be preprogrammed by the manufacturer and the user/installer may have the ability to enable one or more of the preprogrammed shows through an enablement system 204. In an embodiment, a user may download one or more lighting programs to the lighting control system 200. For example, the user may develop a lighting show and download it to the lighting control device 200 to be accessed through the user interface when the enablement system allows such access. In an embodiment, a user may download a lighting program to a lighting control system 200 and the lighting control system may not have the enablement system 204.

In an embodiment, the lighting control system 200 may include power input 208 or the system may be internally powered. In the example of FIG. 3A-3D, the power input 208 is adapted to receive DC power but it should be understood that the lighting control system may be adapted to receive AC or DC power.

In an embodiment, the lighting control system 200 may be configured in a housing 210 and the housing 210 may be so arranged as to fit into a standard electrical junction box (e.g. single or multi-gang wall box). The embodiment illustrated in FIG. 3A-3D is such a design. The measurements of the system 200 are such that it can be fit into a junction box and look very similar to a standard incandescent dimmer control system. In this embodiment, the system 200 is adapted with a user interface 202 which takes the form of a knob. When the knob is depressed, the system 200 selects a new lighting program and when the knob is turned one way or the other, a variable parameter of the lighting program may be altered. To the user, the control over the lighting system may appear be intuitive because the control of the programmable lighting systems resembles the control of standard incandescent lighting systems. As with other embodiments described herein, the system 200 may be arranged to communicate networked lighting control data or data to a stand-alone lighting system.

Figure 4A:
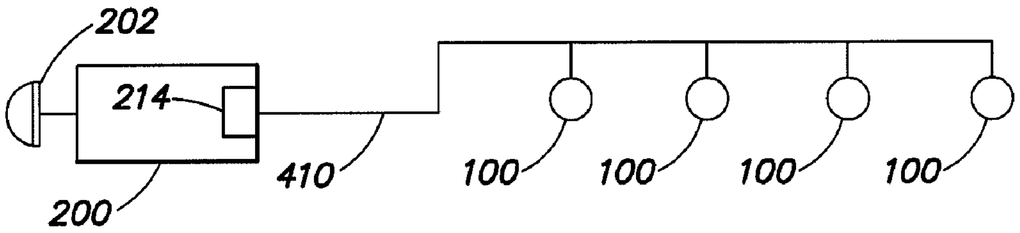
FIG. 4A illustrates a lighting system configuration according to the principles of the present invention.

FIG. 4 illustrates two lighting system configurations 4A and 4B according to the present invention. FIG. 4A illustrates a lighting control system 200 in association with a plurality of lighting systems 100. This configuration may be useful when it is desirous to control a plurality of lighting systems 100 though network control or stand-alone control. For example, the lighting systems 100 may be individually addressable and the control system 200 may be adapted to generate addressable data 410 and communicate the data to the lighting systems 100. The data 410 may be sent in serial or parallel communication and may be sent though wired or wireless systems. In another example, the lighting systems 100 may not be individually addressable and the control system 200 may be arranged to communicate the same data 410 to all of the lighting systems 100 and they may all react as a group. While many of the embodiments have described the lighting control system 200 as sending data 410 to the lighting systems, in an embodiment, it may be arranged to control and communicate analog control voltages or currents to the lighting systems 100.

Figure 4B:
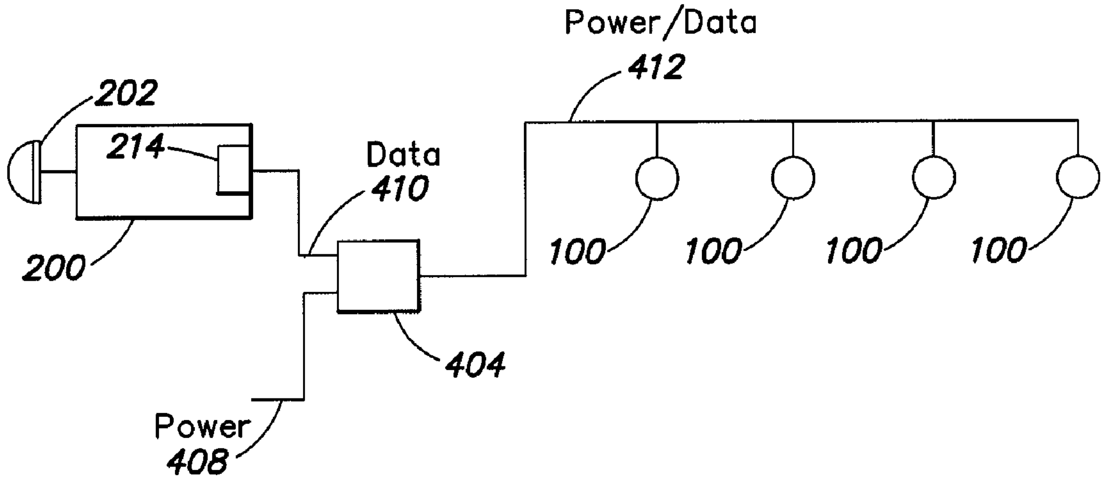
FIG. 4B illustrates a lighting system configuration according to the principles of the present invention.

FIG. 4B illustrates another embodiment according to the present invention. The lighting control system 200 is arranged to communicate data 410 to a power/data multiplexing system 404 and the multiplexing system is also arranged to receive power 408. The multiplexing system is also arranged to communicate multiplexed power and data 412 to the lighting systems 100. Each of the lighting systems 100 in this example are arranged to decode the data from the power, use the power as a power source and use the data to control effects generated by the lighting system 100.

FIG. 4B illustrates another embodiment according to the present invention. The lighting control system 200 is arranged to communicate data to a power/data multiplexing system 404 and the multiplexing system is also arranged to receive power 408. The multiplexing system is also arranged to communicate multiplexed power and data 412 to the lighting systems 100. Each of the lighting systems 100 in this example are arranged to decode the data from the power, use the power as a power source and use the data to control effects generated by the lighting system 100.

As used herein for purposes of the present disclosure, the term "LED" should be understood to include light emitting diodes of all types (including semi-conductor and organic light emitting diodes), semiconductor dies that produce light in response to current, light emitting polymers, electro-luminescent strips, and the like. Furthermore, the term "LED" may refer to a single light emitting device having multiple semiconductor dies that are individually controlled. It should also be understood that the term "LED" does not restrict the package type of an LED; for example, the term "LED" may refer to packaged LEDs, non-packaged LEDs, surface mount LEDs, chip-on-board LEDs, and LEDs of all other configurations. The term "LED" also includes LEDs packaged or associated with phosphor, wherein the phosphor may convert radiant energy emitted from the LED to a different wavelength.

Additionally, as used herein, the term "light source" or "illumination source" should be understood to include all illumination sources, including, but not limited to, LED-based sources as defined above, incandescent sources (e.g., filament lamps, halogen lamps), pyro-luminescent sources (e.g., flames), candle-luminescent sources (e.g., gas mantles), carbon arc radiation sources, photo-luminescent sources (e.g., gaseous discharge sources), fluorescent sources, phosphorescent sources, high-intensity discharge sources (e.g., sodium vapor, mercury vapor, and metal halide lamps), lasers, electro-luminescent sources, cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers capable of producing primary colors. Furthermore, as used herein, the term "color" should be understood to refer to any frequency (or wavelength) of radiation within a spectrum; namely, "color" refers to frequencies (or wavelengths) not only in the visible spectrum, but also frequencies (or wavelengths) in the infrared, ultraviolet, and other areas of the electromagnetic spectrum.

Having thus described several illustrative embodiments of the invention, various alterations, modifications, and improvements will readily occur to those skilled in the art. Such alterations, modifications, and improvements are intended to be within the spirit and scope of the invention. Accordingly, the foregoing description is by way of example only, and is not intended as limiting. The invention is limited only as defined in the following claims and the equivalents thereto.

What is claimed is:

1. A lighting control system, comprising:

a processor;

a memory associated with the processor;

a plurality of lighting programs stored in the memory;

a selection interface adapted to selectively enable and disable an ability to select at least one lighting program of the plurality of lighting programs for execution by the processor; and a user interface configured to facilitate the selection of the at least one lighting program for execution by the processor when the selection interface is arranged to enable the selection of the at least one lighting programs;

wherein the lighting control system is configured such that the selection interface is not accessible during the selection and execution of the at least one lighting program.

2. The system of claim 1, wherein the at least one lighting program, when executed by the processor, controls a color of light generated by a lighting system.

3. The system of claim 2, further comprising the lighting system coupled to the processor, wherein the lighting system comprises a networked lighting system.

4. The system of claim 3 wherein the networked lighting system comprises an addressable controller.

5. The system of claim 4 wherein the networked lighting system further comprises an LED lighting system.

6. The system of claim 5 wherein the LED lighting system is adapted to generate a range of colors of the light in response to execution, by the processor, of the at least one lighting program.

7. The system of claim 5 wherein the LED lighting system is adapted to generate a range of intensities of the light in response to execution, by the processor, of the at least one lighting program.

8. The system of claim 1, wherein the at least one lighting program, when executed by the processor, controls an intensity of light generated by a lighting system coupled to the processor.

9. The system of claim 8, further comprising the lighting system coupled to the processor, wherein the lighting system comprises a networked lighting system.

10. The system of claim 9 wherein the networked lighting system comprises an addressable controller.

11. The system of claim 10 wherein the networked lighting system further comprises an LED lighting system.

12. The system of claim 11 wherein the LED lighting system is adapted to generate a range of colors of the light in response to execution, by the processor, of the at least one lighting program.

13. The system of claim 11 wherein the LED lighting system is adapted to generate a range of intensities of the light in response to execution, by the processor, of the at least one lighting program.

14. The system of claim 1, wherein the at least one lighting program, when executed by the processor, controls a plurality of lighting systems coupled to the processor.

15. The system of claim 14, further comprising the plurality of lighting systems coupled to the processor, wherein the plurality of lighting systems comprises networked lighting systems.

16. The system of claim 15 wherein each of the plurality of lighting systems comprises an addressable controller.

17. The system of claim 16 wherein each of the plurality of lighting systems further comprises an LED lighting system.

18. The system of claim 17 wherein each of the LED lighting systems is adapted to generate a range of light colors in response to execution, by the processor, of the at least one lighting program.

19. The system of claim 18 wherein each of the LED lighting systems is adapted to generate a range of light intensities in response to execution, by the processor, of the at least one lighting program.

20. The system of claim 1 wherein the selection interface comprises at least one of a switch, a dial, and a button.

21. The system of claim 1 wherein the selection interface comprises a remotely-controlled selection interface.

22. The system of claim 21 wherein the remotely-controlled selection interface facilitates communication of selection information to the processor though wireless transmission, and wherein the selection information relates to the ability to select the at least one lighting program for execution by the processor.

23. The system of claim 21 wherein the remotely-controlled selection interface facilitates communication of selection information to the processor though wired transmission, and wherein the selection information relates to the ability to select the at least one lighting program for execution by the processor.

24. The system of claim 1 wherein the selection interface comprises a selection interface port adapted to receive selection information from a second processor.

25. The system of claim 1, further comprising:

a housing for receiving at least the processor and the memory therein, the housing configured such that the selection interface is not accessible during the selection and execution of the at least one lighting program.

26. The system of claim 25, wherein the housing is adapted to mount into a standard wall junction box.

27. The system of claim 26 wherein the selection interface is not accessible when the housing is mounted into the standard wall junction box.

28. The system of claim 1 wherein the selection interface is further adapted to selectively enable and disable a second ability to select at least one second lighting program for execution by the processor.

29. The system of claim 28 wherein the user interface is further adapted to facilitate a second selection of the at least one second lighting program for execution by the processor when the selection interface is arranged to enable the second selection of the at least one second lighting program for execution by the processor.

30. The system of claim 1 wherein the user interface further is adapted to facilitate adjustment of at least one parameter of the at least one lighting program.

31. The system of claim 30 wherein the at least one lighting program, when executed by the processor, provides at least one control signal representing a dynamic lighting effect to at least one lighting system coupled to the processor, and wherein the at least one parameter comprises a rate at which the dynamic lighting effect varies.

32. The system of claim 31 wherein the dynamic lighting effect comprises a color-changing lighting effect.

33. The system of claim 31 wherein the dynamic lighting effect comprises a chasing lighting effect.

34. The system of claim 33 wherein the chasing lighting effect comprises a chasing rainbow lighting effect.

35. The system of claim 31 wherein the dynamic lighting effect comprises a lighting effect that apparently moves from the at least one lighting system coupled to the processor to at least one second lighting system coupled to the processor.

36. The system of claim 30 wherein the at least one lighting program, when executed by the processor, provides at least one control signal representing a generated lighting effect to at least one lighting system coupled to the processor, and wherein the at least one parameter comprises at least one color of the generated lighting effect.

37. The system of claim 30 wherein the at least one lighting program, when executed by the processor, provides at least one control signal representing a generated lighting effect to at least one lighting system coupled to the processor, and wherein the at least one parameter comprises at least one intensity of the generated lighting effect.

38. The system of claim 1, further comprising:

a communication port adapted to receive the at least one lighting program from an external source, wherein the lighting control system is adapted to store the received at least one lighting program in the memory.

39. A control system, comprising:

a processor;

a memory associated with the processor;

at least one lighting program stored in the memory, wherein the at least one lighting program, when executed by the processor, controls at least one color of light generated by at least one lighting system coupled to the processor;

a user interface adapted to facilitate at least one of a selection of the at least one lighting program for execution by the processor and an adjustment of a parameter of the at least one lighting program;

a housing for at least the processor and the memory, wherein the housing is adapted to mount into a standard wall junction box; and a selection interface adapted to selectively enable and disable the selection of the at least one lighting program, such that the user interface is capable of facilitating the selection of the at least one lighting program only when the selection interface is arranged to enable the selection of the at least one lighting program;

wherein the housing is configured such that the selection interface is not accessible when the housing is mounted into the standard wall junction box.

40. The system of claim 39 wherein the standard wall junction box comprises a single gang box.

41. The system of claim 39 wherein the standard wall junction box comprises a double gang box.

42. The system of claim 39 wherein the housing is approximately 69 millimeters in length.

43. The system of claim 39 wherein the housing further comprises two mounting holes spaced approximately 81 millimeters apart.

44. The system of claim 39 further comprising the at least one lighting system coupled to the processor, wherein the at least one lighting program, when executed by the processor, provides the at least one lighting system with at least one control signal configured to adjust the at least one color of the light generated by the at least one lighting system.

45. The system of claim 39 further comprising the at least one lighting system coupled to the processor, wherein the at least one lighting program, when executed by the processor, provides the at least one lighting system with at least one control signal configured to adjust an intensity of the light generated by the at least one lighting system.

46. The system of claim 39 wherein the at least one lighting system comprises an LED lighting system adapted to generate a range of colors of the light.

47. A method of controlling at least one lighting system configured to generate variable color light, comprising steps of:

A) storing a plurality of lighting programs in a memory, wherein at least one lighting program of the plurality of lighting programs, when executed by a processor, controls the variable color light;

B) selectively enabling and disabling selection of the at least one lighting program for execution by the processor; and C) selecting, via a user interface, the at least one lighting program for execution by the processor; while precluding the step B.

48. The method of claim 47, wherein the at least one lighting program, when executed by the processor, controls a color of the variable color light generated by the at least one lighting system.

49. The method of claim 47, wherein the at least one lighting system comprises a plurality of lighting systems.

50. The method of claim 47, wherein the at least one lighting system comprises at least one addressable lighting system.

51. The method of claim 47, wherein the memory is coupled to a housing.

52. The method of claim 51 further comprising a step of: mounting the housing into a standard wall junction box.

53. The method of claim 52 wherein the step of mounting the housing into the standard wall junction box comprises mounting the housing into the standard wall junction box such that a user cannot selectively enable and disable the ability to select the at least one lighting program for execution, and wherein the step of selectively enabling and disabling the ability to select the at least one lighting program for execution comprises selectively enabling and disabling the ability to select that at least one lighting program for execution prior to mounting the housing into the standard wall junction box.

54. The method of claim 47 further comprising a step of:

adjusting, via the user interface, at least one parameter of the at least one lighting program.

55. A method of controlling at least one lighting system configured to generate variable color light, comprising steps of:

A) storing at least one lighting program in a memory, wherein the at least one lighting program, when executed by a processor, controls the variable color light;

B) mounting a housing for at least the processor and the memory into a standard wall junction box;

C) performing, via a user interface, at least one of a selection of the at least one lighting program and an adjustment of a parameter of the at least one lighting program; and D) prior to the step B), selectively enabling and disabling, via a selection interface, an ability to select the at least one lighting program for execution by the processor, wherein the selection interface is inaccessible after the step B).

56. The method of claim 55 wherein the housing is adapted to mount into a standard single-space junction box.

57. The method of claim 55 wherein the housing is adapted to mount into a standard multi-space junction box.

* * * * *

UNITED STATES PATENT AND TRADEMARK OFFICE

CERTIFICATE OF CORRECTION

PATENT NO. : 7,233,831 B2
APPLICATION NO. : 10/163085
DATED : June 19, 2007
INVENTOR(S) : Michael K. Blackwell It is certified that error appears in the above-identified patent and that said Letters Patent is hereby corrected as shown below:

Col. 9, lines 35 - 52, should read,

1. A lighting control system, comprising:

a processor;

a memory associated with the processor;

a plurality of lighting programs stored in the memory;

a selection interface adapted to selectively enable and disable an ability to select at least one lighting program of the plurality of lighting programs for execution by the processor; and a user interface configured to facilitate the selection of the at least one lighting program for execution by the processor when the selection interface is arranged to enable the selection of the at least one lighting program;

UNITED STATES PATENT AND TRADEMARK OFFICE

CERTIFICATE OF CORRECTION

PATENT NO. : 7,233,831 B2 
APPLICATION NO. : 10/163085
DATED : June 19, 2007
INVENTOR(S) : Michael K. Blackwell It is certified that error appears in the above-identified patent and that said Letters Patent is hereby corrected as shown below:

Col. 9, lines 35 - 52 (cont'd), wherein the lighting control system is configured such that the selection interface is not accessible during the selection and execution of the at least one lighting program.

Signed and Sealed this

Fourteenth Day of August, 2007

JON W. DUDAS
*Director of the United States Patent and Trademark Office*